Figure 1:
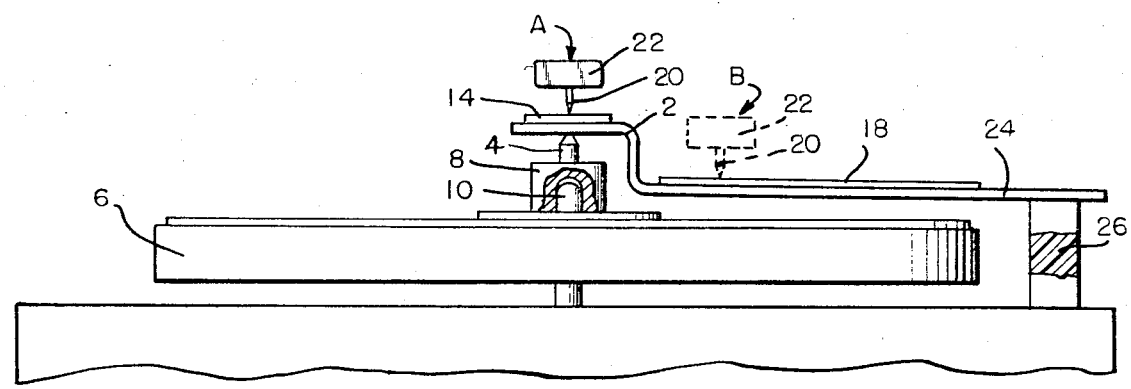

United States Patent
Rabinow

[15] 3,653,255
[45] Apr. 4, 1972

[54] RUMBLE TESTER FOR PHONOGRAPHS

[72] Inventor: Jacob Rabinow, Bethesda, Md.

[73] Assignee: Max L. Libman, Reston, Va. a part interest

[22] Filed: Aug. 6, 1970

[21] Appl. No.: 61,765

[52] U.S. Cl. ..................................................73/67, 73/71.4
[51] Int. Cl. ..........................................................G01h 1/00
[58] Field of Search..................73/67, 67.1, 67.2, 71.4, 462, 73/472

[56] References Cited

UNITED STATES PATENTS

| | | | |
|---|---|---|---|
| 2,671,135 | 3/1954 | Woodward | 73/71.4 X |
| 2,754,678 | 7/1956 | Stinger | 73/71.4 |

Primary Examiner—Richard C. Queisser
Assistant Examiner—John P. Beauchamp
Attorney—Max L. Libman

[57] ABSTRACT

A rumble testing device for phonographs consists of a small adapter member to be placed over the center of a turntable. The adapter is provided with a vertical pin concentric with the spindle of the turntable. A sheet metal or plastic bracket rests on this pin so that it does not turn with the turntable. One end of the bracket rests on the pin while the other end rests on a block of soft, spongy material. Any vibration in the vertical or horizontal direction of the turntable is transmitted to this member. By placing the stylus of the cartridge of a photograph arm on the top surface of this strip member, either immediately above the pivot or close to it, the vibration of the turntable can be detected without the use of special "silent groove" test records and without the interference of the noise produced by such records being played.

5 Claims, 4 Drawing Figures

PATENTED APR 4 1972

3,653,255

INVENTOR
Jacob Rabinow

BY Max L. Libman

ATTORNEY

RUMBLE TESTER FOR PHONOGRAPHS

DESCRIPTION OF THE INVENTION

The conventional method of testing the rumble of a turntable is to use a record which has what are known as "silent grooves" and playing this record with a conventional phonograph pickup. The output of the amplifier is then measured or audibly judged to determine the amount of vibration which is present in the turntable. The difficulty with this classical approach is that the record has to have perfectly silent grooves, or at least grooves which are much more quiet than the rumble. This is difficult to achieve since the recording equipment also has some noise and this noise is cut into the record. Also, the gain of the amplifier during such tests is usually made quite high so that the needle-scratch and noises due to the needle rubbing in the groove are quite appreciable and special filters have to be used to isolate these noises from the vibrations of the turntable.

My invention consists of a simple device to isolate the rotational velocity of the turntable from the cartridge and still couple the cartridge to the turntable.

Figure 2:
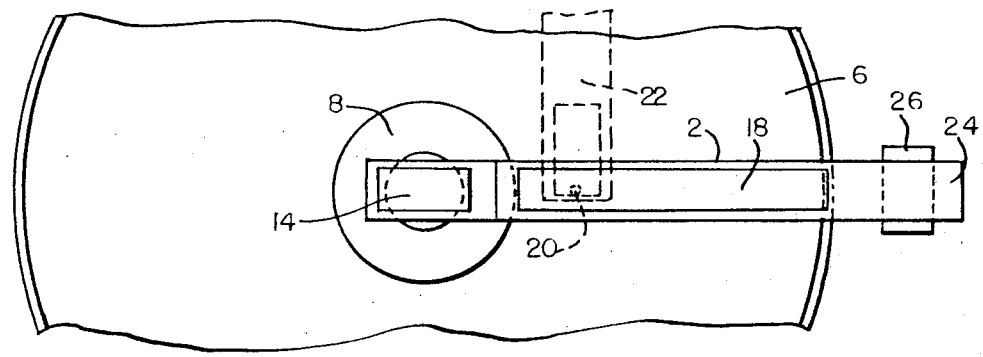
Figure 3:
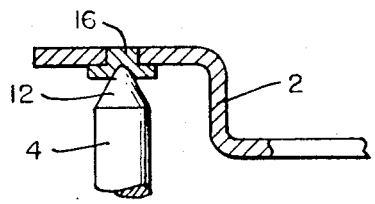
Figure 4:
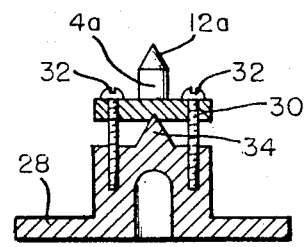

The specific nature of my invention, as well as other objects and advantages thereof, will clearly appear from a description of a preferred embodiment, as shown in the accompanying drawing, in which:

FIG. 1 shows a side view of the rumble tester;
FIG. 2 shows the top view;
FIG. 3 is a detail view of the bearing; and
FIG. 4 shows an alternate construction of the bearing.

The device consists of two parts. The main component is a bent piece of metal or plastic 2, such as shown in FIGS. 1 and 2. One end of this member 2 rests on the rotating pivot 4 coupled to the turntable 6. The second part of my device consists of a small adaptor 8 which fits over the spindle 10, and the top of which ends in a rather sharp well-polished pivot 4. The pivot 4 preferably has a spherical point 12 (FIG. 3) with a radius comparable to that of a phonograph stylus, that is in the order of one to several mils. It should be well polished so that when it rotates in a dimple coined or molded into the strip 2, it does so smoothly and quietly. Instead of a simple dimple, a separate small bearing 16 can be inserted as shown in FIG. 3, particularly if the strip 2 is made of material such as aluminum which normally does not produce a very smooth bearing.

The top of the strip 2 is covered with soft material 14 such as a piece of paper adhesive tape or similar material on which the stylus 20 of the cartridge 22 can be made to rest without damage.

The operation of the device is as follows: The adapter 8 is placed on the top of the turntable 6 as shown in FIG. 1. The strip 2 is placed on the pivot 4. The other end 24 rests on the spongy material 26 such as urethane foam or sponge rubber, so that strip member 2 can vibrate freely when driven by the vibration of the point 12.

As the turntable 6 rotates, the strip 2 does not rotate, but if the turntable exhibits any vertical or horizontal vibrations, they will be transmitted by the point 4 to the strip 2. If cartridge 22 is placed directly above the pivot 4, as shown at A in FIG. 1, the stylus 20 will experience all the components of vibration except the rotational component which, of course, is isolated by the member 2. Thus any vertical or horizontal vibration of the turntable 6 that is transmitted to the pickup 22 will be amplified by the amplifier to which it is connected and can be heard in a loudspeaker or measured by a meter connected to the said amplifier.

If the cartridge 22 cannot move to the center of the turntable 6 and cannot be lifted to the height as shown at A, it can be placed as close to the center as possible as shown at B, using strip 18 similar to strip 14. In such a case some of the vibrations will be somewhat reduced. For example, if the member 2 is 7 inches long and the cartridge 22 is 1 inch away from the center, certain vibrational components will be reduced roughly by one-seventh, while others will be transmitted intact. The vibrations parallel to the member 2, that is, from left to right in FIG. 1, will be transmitted in their entirety, while vibrations up and down or in a plane perpendicular to the plane of the drawing will be attenuated slightly. If precise measurements are to be made, these reductions can be corrected by computation. As I stated earlier, if the cartridge can be placed directly over the pivot as shown at A, all the vibrations are transmitted intact.

It is important that the tip 12 of the vertical pivot 4 be made very smooth and highly polished and that good bearing material be used to rest against it. In other words, the member 2 can be made of brass for example, or the bearing insert 16 as shown in FIG. 3 can be used, said insert being made of bearing material such as brass, nylon or teflon. The diameter of the tip can, of course, be made quite small, except it should be large enough to support the weight of the member 2 and the cartridge 22. Since the cartridge force in modern phonographs is something in the order of 1 gram, the total force exerted on this pivot can be no more than 2 or 3 grams, and therefore a very fine point can be used.

It is also important that the point 12 be concentric with the turntable 6, otherwise a wobble motion will be transmitted to the member 2 and will be, in turn, transmitted to the cartridge 22. This wobble motion is undesirable since it has components parallel to the stylus and will drag the stylus across the supporting surface 18 of member 2. This will produce noises which are undesirable. If the pivot 4 is centered accurately, the stylus will stand still except for the vibrations of the turntable.

The concentricity of point 12 with the turntable can be assured by careful workmanship, or the point 12 can be adjusted either by bending the rod 4, or by a construction such as shown in FIG. 4. Here the member 28 resting on the surface of the turntable 6 is separate from the piece 30 that carries the pivot 4a. The piece 30 that carries the pivot 4a is adjusted by means of three screws 32 which are adjusted till the pivot point 12a stands still when the turntable 6 is rotating. As can be seen from FIG. 4, the pivot is attached firmly to the plate 30, resting on the point 34 which is on the coupling member 28 resting on the turntable 6. By the tightening or loosening the three screws 32, the plate 30 is rocked so as to move the point 12a slightly in any desired direction.

I claim:

1. A rumble tester for a phonograph comprising an adapter device to be placed on top of a turntable, said adapter having pivot means thereon to provide pivot means directly above the center of the turntable, platform means resting on said pivot means, means to keep the platform from turning, a supporting surface on said platform means designed to support a phonograph pickup device so that the rotation of the turntable is isolated from said pickup device while the vibrations of the turntable are transmitted to the pickup device.

2. The device of claim 1, and adjusting means to move the pivot to become concentric with the turntable.

3. A rumble tester for a phonograph turntable comprising
   a pivot device for mounting on said turntable,
   c. a pivot member adjustably supported on said pivot device directly above the center of said turntable,
   d. said pivot member terminating in a polished, low-friction pivot point,
   e. means for adjusting said pivot point to position it accurately above the center of rotation of said turntable,
   f. support means fixed away from said turntable,
   g. platform means resting on said pivot point and on said fixed support means thus permitting rotation of said turntable,
   h. a vibration pickup device resting on said platform means for picking up vibrations transmitted to said platform means by rotation of said turntable.

4. The invention according to claim 3, said platform having a polished pivot bearing resting on said pivot point.

5. The invention according to claim 3, said pickup device being a phonograph pickup.

* * * * *